March 17, 1964 P. J. PETERS ETAL 3,124,971
COUPLING DEVICE
Filed March 1, 1962

INVENTORS
Pete J. Peters
Paul V. De Luca

BY *Lawrence I. Field*

ATTORNEY

United States Patent Office 3,124,971
Patented Mar. 17, 1964

3,124,971
COUPLING DEVICE
Pete J. Peters, 36—27 30th St., Long Island City, N.Y., and Paul V. De Luca, 79—03 19th Drive, Jackson Heights, N.Y.
Filed Mar. 1, 1962, Ser. No. 176,607
8 Claims. (Cl. 74—579)

This invention relates to potentiometers, and to drives for rectilinear potentiometers. Rectilinear potentiometers for purposes of this invention are defined as devices such as those shown in Gottschall et al. United States Patent 2,863,031 or Abatemarco et al. United States Patent 2,902,663 and others of a similar construction and include a track element along which a brush or wiper moves in electrical contact, the rectilinear motion of the brush being controlled by a device which drives and positions a shaft and brush block supporting the brushes.

The present invention is concerned particularly with the couplings of precision potentiometers of the type described to their associated drive shafts. Such potentiometers are often used for feedback and other control purposes and for devices which are used, for instance, to position the control surfaces of aircraft and guided missiles. In such devices, one commonly encountered problem results from misalignment of the potentiometer and the device which drives the potentiometer. Misalignment between the driven and the driving shafts produces non-uniformity of response, non-linearity of forces inside the potentiometer and improper distribution of stresses resulting in accelerated and irregular wear and in inaccurate outputs from the device. Misalignment of the potentiometer shaft and the drive shaft can result in severe stresses on the potentiometer shaft and its sleeve bearing. Further consequences of misalignment are irregular motion of the potentiometer shaft due to chatter in the bearing, which chatter communicates itself to the wiper of the potentiometer and thus may cause noise in the potentiometer output signal. Severe wear of potentiometer parts may also result. It is also desirable to have free rotation between the driven and driving shafts for ready assembly, if this can be done without introducing backlash in the reciprocating motion.

It is therefore, an object of this invention to provide a new and improved coupling for rectilinear motion potentiometers.

It is another object of this invention to provide a new and improved coupling for potentiometers to accommodate misalignment between the potentiometer and its driver.

Other objects and advantages of this invention will become apparent as the following description proceeds, which description should be considered together with the accompanying drawings in which.

Figure 1:
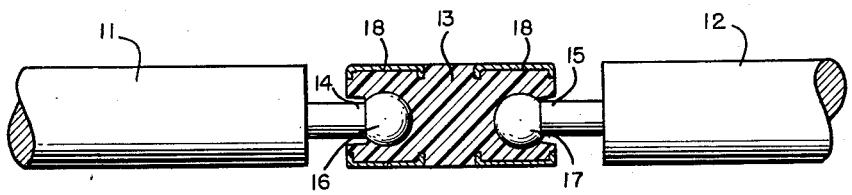
FIG. 1 is a view, partially in section, of the coupling of this invention connecting a potentiometer shaft with a shaft which actuates, positions or drives the potentiometer shaft.

Referring to the drawings in detail, FIGURE 1 shows a shaft 11 of a rectilinear potentiometer of any conventional design to which a shaft 12 of a potentiometer driver is to be connected. An extension 14 protrudes from one end of shaft 11 which extension terminates in a ball 16, and the shaft 12 is similarly fashioned with a portion 15 of relatively smaller diameter than shaft 12 and terminating in a ball 17. A coupling member 13 connecting potentiometer shaft 11 with drive shaft 12 comprises a body portion which may be of any suitable shape such as a cylinder or an elongated member having a rectangular, square, triangular or other cross-section, and may be formed of any thermoplastic or thermosetting material possessing suitable properties. One suitable material is a diallyl phthalate resin, filled with a polyester such as Dacron. A socket in each end of coupling member 13 receives one of the two balls 16 and 17 of the two shafts 11 and 112. A metallic member 18 consisting of a short tubular length of steel the ends of which are upset, is incorporated in coupling member 13 at each end to give added radial strength and rigidity to the coupling member at the time it is formed, by molding. As better seen in FIG. 2, the portion 23 of the coupling 13 which serves as an entrance to the sockets is cut back an angle of about 10° with the axis of the coupling 13 to allow the axis of the extending portion 14 of the shaft 11 to assume a similar angle with the axis of the coupling member 13. The same angular cutback is provided at the other end for the reduced portion of the shaft 12. From FIG. 3, it can be seen that the ball 16 fits tightly within the socket and is preferably surrounded by a thin film 21 of lubricous polymer material such as fluorinated polymer, e.g. such as Teflon or the like although such material may be omitted with some materials. It will be noted that the coupling member 13 is relatively thin at the section shown in FIG. 3. As shown metallic reinforcing member 18 extends well past this section in order to prevent stretching of the socket.

Figure 2:
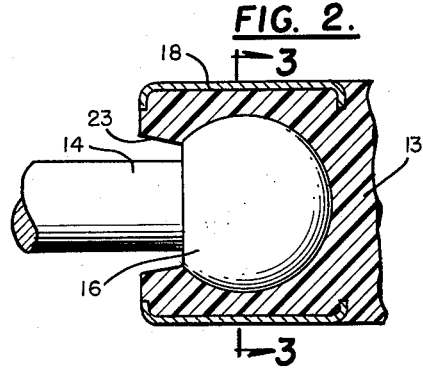
FIG. 2 is an enlarged sectional view of a portion of the coupling of FIG. 1.
Figure 3:
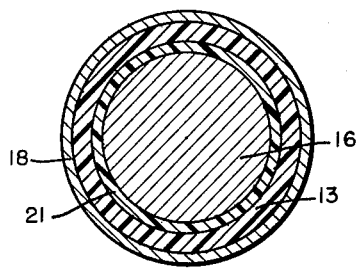
FIG. 3 is a sectional view taken along line III—III of FIG. 2.
Figure 4:
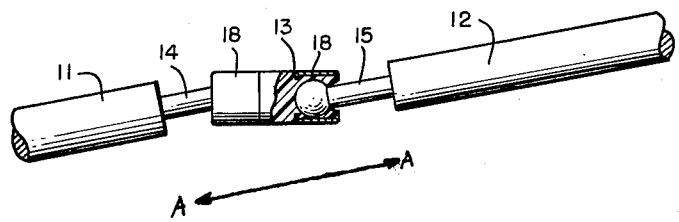
FIG. 4 is a side view, partially in section, of two shafts which are misaligned and the manner in which the coupling of this invention overcomes the effect of such misalignment.

The operation of the device of FIGURES 1-3 is best shown in FIG. 4 where the two shafts 11 and 12 are shown in axial misalignment. As shaft 12 moves axially in driving shaft 11 in the direction of arrows A—A, the motion of shaft 12 is unequivocally transmitted to shaft 11, despite their misalignment. It is important that the fit between balls 16 and 17 and the surrounding plastic be exceedingly close, so that no backlash occurs on reversal of motion. At the same time, free rotation about the balls must be possible to minimize side thrust, and to permit relative rotation of the shafts. The use of a Teflon coating 21 on the balls cooperates to provide and maintain free rotation of the balls in their respective sockets. In addition, when the coupling member 13 is made by molding directly about the ball-shaped ends of shafts 11 and 12, coating 21 prevents the coupling member 13 from sticking to the balls 16 and 17 which would prevent the proper operation of the coupling. When used, the Teflon coating is applied to the balls preferably in the manner described in Treff application, Serial No. 15,488, filed March 16, 1960, namely by applying a suitable coating formulation based on a lubricous polymer, to the ball portions of shafts 11 and 12, removing excess coating, air drying and then heating the coated balls.

It is possible, however, to omit the coating 21 from the balls when the coupling member 13 is formed of suitable materials, such as diallyl phthalates or phenolics filled with a tetrafluorethane such as Teflon, a polyamide such as nylon or a polyester such as Dacron. In each of these materials, the strength of the material is sufficient to withstand the attendant forces and the balance of the coefficients of slippage are also satisfactory. The shafts 11 and 12 and the balls 16 and 17 at the ends of the shafts may suitably be stainless steel among other materials.

The coupling member 13 is suitably molded into position on the balls 16 and 17 of two shafts with the metal strengthening members 18 inserted into the mold before molding. Compression molding may be used although transfer molding has also been found satisfactory. When using materials of the types specified above for the coupling member 13, the shrinkage of the resin provides an extremely close fit, even actual physical pressure of coupling member 13 on balls 16 and 17 preventing backlash during reciprocating motion, and the use of the coating 21 of a material such as Teflon provides free rotation of the balls in the coupling member to accommodate either misalignment or rotation of driving shaft 12. If space is of no importance, the coupling member 13 may be made larger in section and the reinforcing members 18 may be omitted. They may also be omitted if other sectional shapes than the circular one shown are used.

This specification has described a new and improved coupling device for coupling together the shafts of a rectilinear potentiometer and its driver when the two are not in perfect alignment while providing the proper torque transmitting properties necessary for suitable operation of the system. It is realized that this description may suggest to others in the art other forms of the invention wtihout departing from the spirit thereof. It is intended, therefore, that this invention be restricted only by the scope of the appended claims.

What is claimed is:

1. A coupling device for coupling a reciprocating driven potentiometer shaft to a reciprocating driving shaft for the transmission of reciprocating rectilinear motion therebetween, said coupling device comprising an elongated body; said body having a first end and a second end; a concavity formed in each of said first and second ends; said concavities being spherical in shape; said first and second ends having passages formed therein for providing said concavities with access from the outside of said body; and a generally spherical protuberance on an end of each of said shafts; each of said protuberances being formed to mate with one of said concavities and each being fitted within one of said concavities whereby rectilinear motion may be transmitted from said driving shaft through its protuberance to the coupling device and through the coupling device and the other protuberance to said driven shaft even though said driven and driving shafts are not axially aligned.

2. A system for reciprocating a potentiometer shaft from a driving shaft when said potentiometer shaft and said driver shafts are not in true alignment, said system comprising, a potentiometer shaft, a driving shaft attached to a device for driving said potentiometer shaft, a coupling member connecting said potentiometer shaft to said driving shaft, said coupling member comprising a body of synthetic resin having a spherical concavity formed in each end, each of said concavities communicating with the outside of said body by a narrow passage, the inside dimension of said passage being larger than the outside dimension of the respective one of said shafts penetrating said passage, a reinforcing member surrounding the outside of each end of said body at approximately the location of said concavities, and a ball-shaped protuberance a tone end of each of said potentiometer and driving shafts, said protuberances being individually fitted within one of said concavities to provide means for the transmission of rectilinear motion from said driving shaft to said potentiometer shaft.

3. The system defined in claim 2 wherein said body is formed of a diallyl phthlate resin filled with linear polyester.

4. The system defined in claim 2 wherein said body is formed of a filled phenolic resin.

5. The system defined in claim 2 further including a layer of lubricious polymeric material over each of said protuberances.

6. The device of claim 1 in which the elongated body portion of said coupling device is a monolithic plastic member surrounding the protuberances on said shafts.

7. The device of claim 1 wherein at least one of said protuberances is provided with a thin coating of lubricious material disposed between it and its concavity in said coupling member.

8. The system of claim 2 in which a lubricious coating is disposed between at least one of said protuberances and the inner wall of its concavity.

References Cited in the file of this patent

UNITED STATES PATENTS

| | | |
|---|---|---|
| 1,069,436 | Lacerda | Aug. 5, 1913 |
| 2,792,694 | Merel | May 21, 1957 |
| 3,017,209 | Thomas | Jan. 16, 1962 |
| 3,025,090 | Langen | Mar. 13, 1962 |
| 3,037,380 | Minke | June 5, 1962 |